United States Patent [19]

Berlin

[11] 4,029,245
[45] June 14, 1977

[54] AUTOMOBILE MATERIAL CARRIER

[76] Inventor: David L. Berlin, 10503 S. 198th E. Ave., Broken Arrow, Okla. 74012

[22] Filed: Jan. 14, 1976

[21] Appl. No.: 648,966

[52] U.S. Cl. .......................... 224/42.43; 224/42.07; 211/60 R

[51] Int. Cl.[2] ..................................... B60R 11/00

[58] Field of Search ........... 224/42.43, 42.44, 29 R, 224/42.45 R, 42.46 R, 42.42 R; 296/26; 211/1.3, 60 R, 49 R; 214/86 R

[56] References Cited

UNITED STATES PATENTS

| 2,729,499 | 1/1956 | Eggum | 224/42.42 R X |
| 2,795,363 | 6/1957 | Turner | 224/42.43 |
| 3,897,880 | 8/1975 | Waske et al. | 214/147 R |

*Primary Examiner*—Robert J. Spar
*Assistant Examiner*—Jerold M. Forsberg
*Attorney, Agent, or Firm*—Robert D. Farkas

[57] ABSTRACT

A demountable carrier for supporting materials in the trunk compartment of an automobile includes a frame of hollow tubular members which are assembled onto hinged brackets secured to the floor of the trunk. The frame has two lateral tubular members at the ends, one extending between the hinged brackets at opposite sides of the trunk and another extending across the back of the automobile outside the open trunk. A longitudinal tubular member connects the two lateral members and rests on a vertical tubular support on the trunk floor. The height and width of the frame are adjustable to fit different sized trunk compartments and maintain the frame in a horizontal position. When not in use the frame is taken apart and stored and the trunk lid is closed.

5 Claims, 5 Drawing Figures

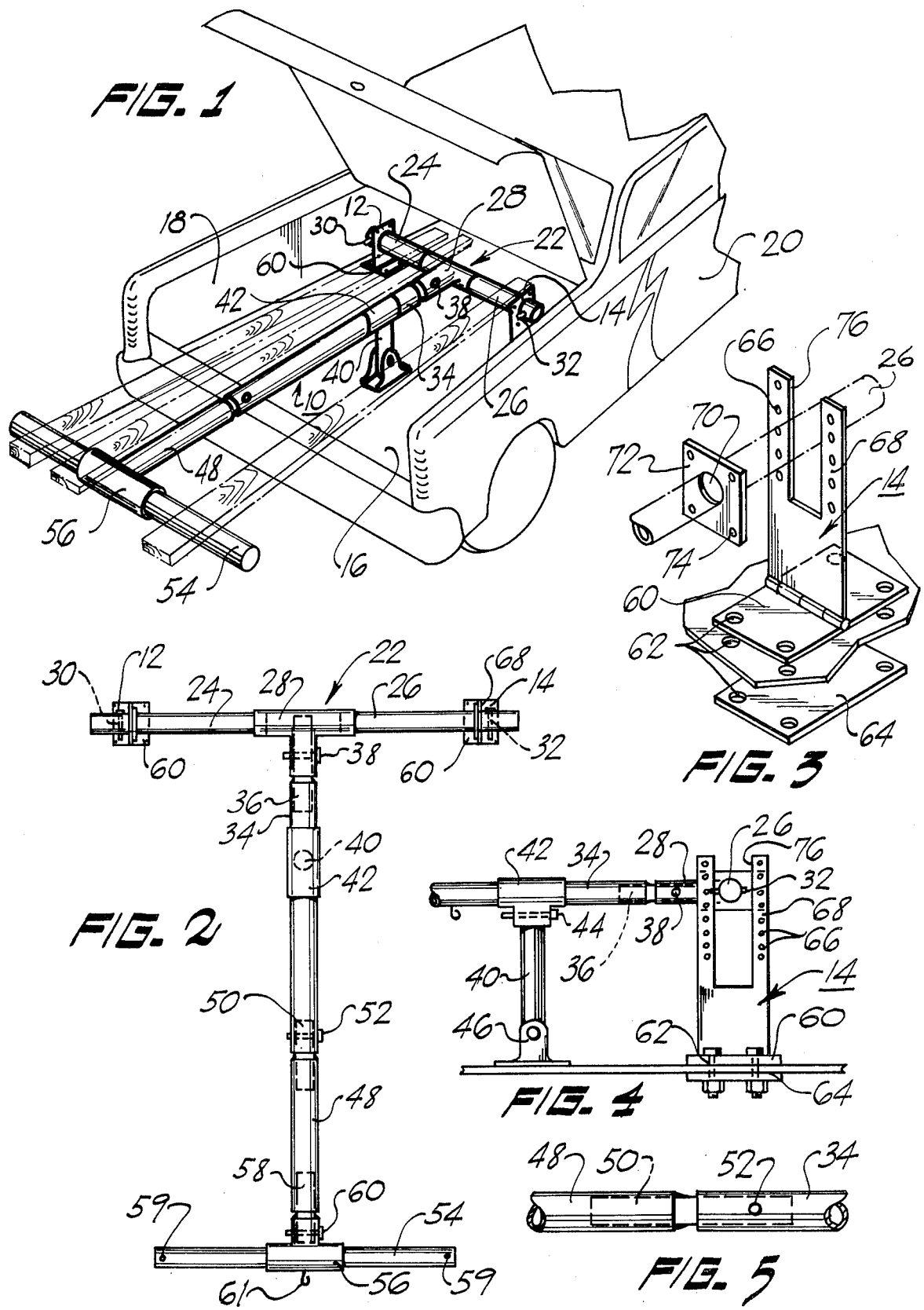

AUTOMOBILE MATERIAL CARRIER

BACKGROUND OF THE INVENTION

1. Field of the Invention

The present invention relates to automobile carriers and particularly to a demountable carrier which extends from the trunk compartment.

2. Description of the Prior Art

It is often necessary for an individual to transport long heavy items such as building materials or lumber by private automobile. These items normally cannot fit within the standard sized automobiles or trunk compartments and it is not desired to rent or borrow larger vehicles or wait and pay for delivery service. Securing materials to the roof of the car can also cause damage or make driving difficult. Special carriers which are mounted on the roof and rear bumpers are available, but these are complex, costly, and difficult to assemble and then take apart when not used. Examples of such prior art devices are shown in U.S. Pat. No. 3,260,929 issued July 12, 1966 and U.S. Pat. No. 3,144,183 issued Aug. 11, 1964.

SUMMARY OF THE INVENTION

It is therefore the primary object of the present invention to provide a simplified carrier for automobiles which extends from the trunk compartment and is readily assembled when needed and then taken apart when not in use.

This is accomplished with a frame of tubular members mounted on hinged brackets secured to the floor of the trunk compartment. One tubular cross member includes two sections extending laterally from the respective hinged brackets at opposite sides of the trunk and a T-shaped connecting center tubular member which joins the two lateral sections to a longitudinally extending tubular member. The longitudinal member includes two tubular sections joined together and extending out of the open trunk compartment. Another T-shaped center section joins the outer longitudinal section to a second cross member in the form of a lateral tube extending behind the trunk. The longitudinal member is supported on the trunk floor by a vertical tubular member. The assembly can be adjusted in height and width for different sized trunk compartments and to provide a level position. The tubular members can be readily assembled for use and taken apart so that the trunk can be closed when the carrier is not needed. Other objects and advantages will become apparent from the following description in conjunction with the accompanying drawings.

BRIEF DESCRIPTION OF THE DRAWINGS

FIG. 1 is a pictorial representation of the carrier assembly extending from the trunk compartment of an automobile;

FIG. 2 is a plan view of the carrier;

FIG. 3 is a representation of the hinged brackets supporting the tubular cross member in the trunk;

FIG. 4 is a partial side view of the carrier mounted in the trunk; and

FIG. 5 is a detailed view of a joint between longitudinal tubular sections.

DESCRIPTION OF THE PREFERRED EMBODIMENT

As shown in FIGS. 1 and 2, a carrier frame 10 is secured to a pair of hinged brackets 12, 14 mounted on opposite sides of the floor 16 of the trunk compartment 18 of an automobile 20. The frame includes a first cross member 22 having two tubular laterally extending sections 24, 26 supported by respective opposite brackets 12, 14. A T-shaped center tubular member 28 engages the two lateral sections which fit within the larger diameter center member. A pair of pins 30, 32 are inserted into holes at the respective outer edges of tubular sections 24, 26 to secure the cross member in position between brackets 12, 14 and prevent lateral movement.

The center tube of the T-shaped member 28 is joined to a longitudinal tubular member 36 which fits within both members 28, 34 and is secured in position by a pin 38 through aligned holes in the center tube of member 28 and inner tube member 36. Longitudinal member 34 is supported on the floor of the trunk compartment by a vertical tubular member 40 which fits into a larger diameter T-shaped member 42 and a hole in longitudinal member 34 as shown in further detail in FIG. 4. A pin 44 through holes in the lower center part of T-shaped member 42 and vertical member 40 holds the elements in position. The lower end of vertical member 40 is connected to a pivotal support 46 with a flat base that rests on the floor of the trunk. Vertical support 40 and brackets 12, 14 maintain the carrier in a level position. Longitudinal member 34 also fits through the larger diameter T-shaped member 42.

A second longitudinal tubular member 48 is secured to the end of the first longitudinal member by another inner tube member 50 with a pin 52 through holes in members 48 and 50 as shown in further detail in FIG. 5. Longitudinal member 48 extends out of the open trunk compartment and is connected to an outer cross member 54 through another T-shaped member 56 and inner tube member 58, with a pin 60 through holes in the center of T-shaped member 56 and inner tube member 58. Cross member 54 may be a single long lateral tubular member which fits into the larger diameter T-shaped member 56. Holes 59 and a hook 61 are provided for tieing materials on the carrier.

The width of the carrier assembly is adjusted to fit the width of the particular trunk compartment by securing hinged brackets 12, 14 at the opposite sides on the floor of the trunk, as shown in FIGS. 1, 2, 3 and 4. The bottom plates 60 of the brackets are secured to floor 16 by nuts and bolts through holes 62 in plate 60, floor 16 and an outer plate 64 below the floor of the trunk. The length of lateral tubular members 24, 26 may also be adjusted to correspond with the trunk width by movement into or out of T-shaped member 28 and by use of spaced holes along members 24, 26 for selective placement of pins 30, 32.

The height of the carrier is made adjustable by a series of vertical holes 66 in the vertical hinged plate 68 of brackets 12, 14. The lateral tubular members 24, 26 are inserted through a central hole 70 in a support plate 72 having holes 74 aligned with holes 66 in plate 68. The support plate is then secured to the bracket plate by screws or bolts through the holes at the desired height. The vertical slot 76 in bracket plate 68 accommodates the lateral tubular member at various heights.

A similar adjustment may be made in vertical support 40 by a series of holes.

The carrier is thus easily installed and assembled for use and then taken apart and the trunk lid closed when not being used. The various pins are removed and tubular members disconnected and stored. The vertical plates of the hinged brackets, which are the the only fixed members, merely pivot down to rest on the trunk floor. While only a single embodiment has been illustrated and described it is apparent that many variations may be made in the particular design and configuration without departing from the scope of the invention as set forth in the appended claims.

What is claimed is:

1. A carrier for an automobile trunk compartment comprising:
   a. a first tubular cross member;
   b. a pair of hinged brackets adapted to be mounted at opposite sides of the trunk floor, said brackets including means for supporting said cross member above said floor between said brackets;
   c. a longitudinal tubular member, means for connecting one end of said longitudinal member to said first cross member;
   d. a second tubular cross member, means for connecting the other end of said longitudinal member to said second cross member, said longitudinal member being of a length such that said other end extends out of said trunk compartment, and a vertical support member adapted to rest on said trunk floor to support said longitudinal member above said floor, said longitudinal member includes a plurality of longitudinal sections and means for securing said sections together, whereby said carrier is utilized to provide support for elongated articles greater in size than said compartment.

2. The device of claim 1 wherein said bracket means for supporting said cross member includes means for adjusting the height of said cross member.

3. The device of claim 2 wherein said height adjusting and supporting means includes a hinged plate having a slot for receiving said cross member and a plurality of spaced holes along said slot, a second plate having an opening for receiving said cross member and a plurality of holes aligned with said hinged plate holes, and means for securing said second plate to said hinged plate through selective spaced holes.

4. The device of claim 1 wherein said means for connecting said ends of said longitudinal members to said cross members includes T-shaped tubular members.

5. The device of claim 1 wherein said means for securing said longitudinal sections include an inner tubular member insertable within adjoining said sections, said inner member and a longitudinal section having aligned holes therein, and a pin insertable into said aligned holes.

* * * * *